Nov. 10, 1931.  K. KRUENING  1,831,627
LENS MOUNT
Original Filed Jan. 25, 1928
Fig.1,
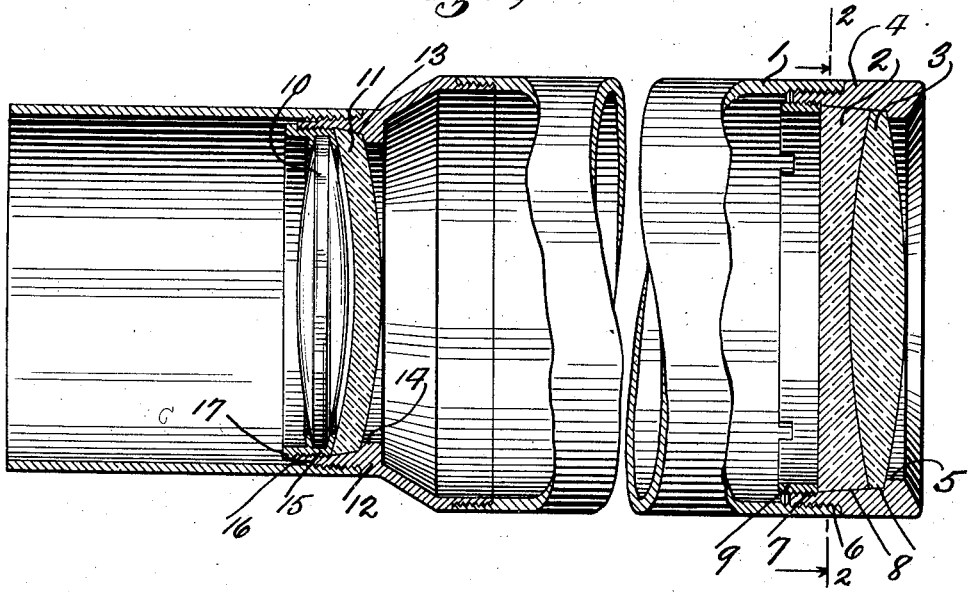
Fig.2,
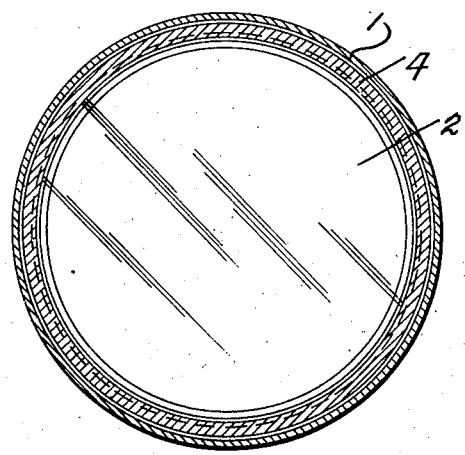
INVENTOR.
Karl Kruening,
BY
Kiddle, Margeson and Horridge.
ATTORNEYS.

Patented Nov. 10, 1931

1,831,627

UNITED STATES PATENT OFFICE

KARL KRUENING, OF JAMAICA, NEW YORK, ASSIGNOR TO KOLLMORGAN OPTICAL CORPORATION, OF BROOKLYN, NEW YORK, A CORPORATION OF NEW YORK

LENS MOUNT

Original application filed January 25, 1928, Serial No. 249,223. Divided and this application filed July 18, 1929. Serial No. 379,137.

This invention relates to mounts for lenses, with particular reference to the mounting of projection lenses in the motion picture industry, although of course not limited to this use. Such a lens system is usually composed of four lenses, one pair being cemented together and to be termed hereinafter the front element, while the two lenses of the other set and to be termed hereinafter the rear element are separable, that is usually not cemented to each other. Inasmuch as these lenses must be removed from their mounts from time to time for cleaning purposes the lenses through ignorance or carelessness are often reversed or become inserted in the wrong position resulting in images of very poor quality.

The present invention has for an object the provision of a construction wherein this possibility is overcome.

In the accompanying drawings:

Fig. 1 is a view in side elevation partly in section of a lens system constructed in accordance with this invention; and Fig. 2 is a section on the line 2—2 of Fig. 1.

Referring to the drawings in detail, 1 designates a lens tube. 2 and 3 designate the lenses of the front element, these two lenses being cemented together. 4 is a lens retaining ring shouldered at 5 internally. The lens retaining ring is threaded externally as indicated at 6 and internally at its rear as shown at 7, the external screw threads 6 enabling the ring to be screwed into the lens tube 1.

The lenses are tapered on their periphery as shown at 8 and the interior of the lens retaining ring 4 is similarly tapered. This tapered construction positively prevents insertion of the lenses in reversed position in the ring 4.

9 designates a clamping ring which is threaded on its exterior and screws into the internally threaded end of the ring 4 for clamping the lenses against the shoulder 5.

The rear element is composed of separable lenses 10 and 11, these lenses being smaller in diameter than the front element and hence not interchangeable therewith. The lenses 10 and 11 also differ from each other.

12 designates a retaining tube for this rear element, this tube being screwed into the lens tube 1. This retaining tube is tapered internally as shown at 13 and shouldered as indicated at 14. The lens 11 is correspondingly tapered on its periphery and hence cannot be inserted incorrectly in the retaining tube.

The lens 10 is provided with a clamping ring 15 spun about its periphery, the periphery of this clamping ring being threaded as indicated at 16 so as to screw into the retaining tube 12. The clamping ring 15 can only be inserted in the retaining tube 12 correctly, the end portion 17 being of larger diameter than the threaded portion.

It will be seen, therefore, that the present invention provides a construction wherein the lenses of both the front element and the rear element must always be inserted correctly.

This application is a division of my copending application Serial No. 249, 223, filed January 25, 1928.

What I claim is:—

1. In projector apparatus the combination of a lens tube, a front element comprising a pair of lenses, a lens retaining ring therefor threaded to said tube, said retaining ring being tapered internally throughout part of its length and the periphery of the lenses being correspondingly tapered to prevent reversal of the lenses in the ring, and said ring having a straight internally threaded portion extending beyond the face of the lenses, and a clamping ring threaded into said projecting portion of the retaining ring.

2. In projector apparatus the combination of a lens tube, a front element comprising a lens retaining ring threaded to said tube and provided with a taper on its interior and with a shoulder at the outer end of the taper, a pair of lenses having their periphery tapered and adapted to be received by the tapered interior of the lens retaining ring, the rear end of said ring being straight and projecting beyond the plane of said lens and a clamping ring threaded to the straight portion of the retaining ring for clamping said lenses against said shoulder.

3. In projector apparatus a rear element comprising a pair of separable lenses, a lens retaining ring tapered internally and provided with an internal shoulder, one of said lenses having a tapered periphery and adapted to be received by the tapered portion of said retaining ring, and a straight sided clamping ring secured to the other of said lenses and adapted to screw into an untapered portion of the said retaining ring to force the first mentioned lens against said shoulder.

4. In projector apparatus a rear element comprising a pair of separable lenses, a lens retaining ring, one of said lenses having a tapered periphery, and said ring being correspondingly tapered internally for receiving said lens, a straight sided clamping ring secured to the other of said lenses and adapted to screw into a straight sided portion of said retaining ring which projects beyond the first mentioned lens to clamp the first mentioned lens in place, said clamping ring at its outer end being shouldered to engage the face of the retaining ring whereby reversal in the retaining ring of the clamping ring and hence of the lens carried thereby is prevented.

This specification signed this 12th day of July, 1929.

KARL KRUENING.